US009225182B2

(12) United States Patent
Kurokawa et al.

(10) Patent No.: US 9,225,182 B2
(45) Date of Patent: Dec. 29, 2015

(54) CHARGE CONTROLLER WITH PROTECTIVE FUNCTION AND BATTERY PACK

(71) Applicants: Gentaro Kurokawa, Atsugi (JP); Daisuke Suzuki, Atsugi (JP); Junji Takeshita, Atsugi (JP)

(72) Inventors: Gentaro Kurokawa, Atsugi (JP); Daisuke Suzuki, Atsugi (JP); Junji Takeshita, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 328 days.

(21) Appl. No.: 13/748,174

(22) Filed: Jan. 23, 2013

(65) Prior Publication Data

US 2013/0200847 A1  Aug. 8, 2013

(30) Foreign Application Priority Data

Jan. 25, 2012 (JP) ................................. 2012-013393

(51) Int. Cl.
    *H02J 7/00* (2006.01)
(52) U.S. Cl.
    CPC ............. *H02J 7/0031* (2013.01); *H02J 7/0042* (2013.01); *H02J 2007/004* (2013.01)
(58) Field of Classification Search
    USPC ......... 320/106, 112, 116, 127, 134, 148, 162, 320/164
    See application file for complete search history.

(56) References Cited

U.S. PATENT DOCUMENTS

| 3,590,358 | A | * | 6/1971 | Ruben ........................... 320/141 |
| 5,583,384 | A | * | 12/1996 | Henry ........................... 307/113 |
| 5,825,155 | A | * | 10/1998 | Ito et al. ....................... 320/118 |
| 5,831,350 | A | * | 11/1998 | McConkey et al. ............ 307/150 |
| 5,903,137 | A | * | 5/1999 | Freiman et al. ................ 320/163 |
| 7,215,096 | B2 |  | 5/2007 | Miura et al. |
| 7,394,224 | B2 |  | 7/2008 | Wanibuchi et al. |
| 2007/0216351 | A1 | * | 9/2007 | Seki .............................. 320/112 |

(Continued)

FOREIGN PATENT DOCUMENTS

| JP | 10290530 A | 10/1998 |
| JP | 2000-092735 | 3/2000 |

(Continued)

OTHER PUBLICATIONS

Related U.S. Appl. No. 13/748,138; Gentaro Kurokawa; Charge Controller with Protection Function and Battery Pack; Jan. 23, 2013.

(Continued)

*Primary Examiner* — Brian Ngo
(74) *Attorney, Agent, or Firm* — Holtz, Holtz, Goodman & Chick PC (57) ABSTRACT

A charge controller includes a charge control circuit that, when detecting that a charging power supply is connected, controls the charging transistor to apply the charge current; a first and second control switch element connected in series between one terminal of a secondary battery and an external terminal; and a protection circuit that, when the secondary battery is over-discharged, turns off the first control switch element to stop discharge current and when deeply discharged, turns off the second control switch element. The protection circuit sends a charge inhibit signal to the charge control circuit when the secondary battery is deeply discharged, and while receiving the charge inhibit signal, the charge control circuit keeps the charging transistor off to prevent the charge current from flowing even if detecting that the charging power supply is connected.

4 Claims, 9 Drawing Sheets

(56) References Cited

U.S. PATENT DOCUMENTS

| | | | |
|---|---|---|---|
| 2008/0074081 A1* | 3/2008 | Croman et al. | 320/134 |
| 2008/0111520 A1* | 5/2008 | Sasaki | 320/134 |
| 2009/0220825 A1* | 9/2009 | Nakashima et al. | 429/7 |
| 2010/0231175 A1* | 9/2010 | Noda | 320/162 |
| 2011/0273145 A1* | 11/2011 | Yamakita et al. | 320/163 |
| 2011/0279095 A1* | 11/2011 | Hong et al. | 320/164 |

FOREIGN PATENT DOCUMENTS

| | | |
|---|---|---|
| JP | 2004-296165 | 10/2004 |
| JP | 2005192383 A | 7/2005 |
| JP | 2007097242 A | 4/2007 |
| JP | 2008017542 A | 1/2008 |
| JP | 2011115012 A | 6/2011 |

OTHER PUBLICATIONS

Non-Final Office Action dated Mar. 10, 2015, issued in related U.S. Appl. No. 13/748,138.

Japanese Office Action (and English translation thereof) dated Sep. 29, 2015, issued in counterpart Japanese Application No. 2012-013393.

Japanese Office Action (and English translation thereof) dated Nov. 4, 2015, issued in Japanese Application No. 2012-013395.

\* cited by examiner

CHARGE CONTROLLER WITH PROTECTIVE FUNCTION AND BATTERY PACK

BACKGROUND OF THE INVENTION

1. Field of the Invention

The present invention relates to a secondary battery charge controller including a protection function against overcharge and over-discharge and relates to an effective technique used for example, in a charge controller incorporated in a lithium-ion battery pack and a semiconductor integrated circuit for the charge controller.

2. Description of the Related Art

In secondary batteries such as lithium-ion batteries, overcharge or over-discharge reduces the battery lifetime. Accordingly, the conventional secondary batteries of mobile phones and the like are often composed as battery packs each incorporating a protection semiconductor integrated circuit (hereinafter, referred to as a protection IC) together with a battery cell in a single case, the protection IC having a protection function against overcharge and over discharge.

In the case of using the aforementioned battery pack, the main device is provided with a charge-controlling semiconductor integrated circuit (hereinafter, referred to as a charge control IC) for charging a secondary battery by voltage from a DC current power supply (a charging power supply) such as an AC adaptor. One of the inventions concerning a charge controller composed of a protection IC and a charge control IC as described above is disclosed in Japanese Patent Laid open Publication No. 2000-92735 (Japanese Patent No. 4003311), for example. In another proposed invention, a protection IC and a charge control IC are incorporated in a battery pack (Japanese Patent Laid-open Publication No. 2004-296165).

Figure 5:
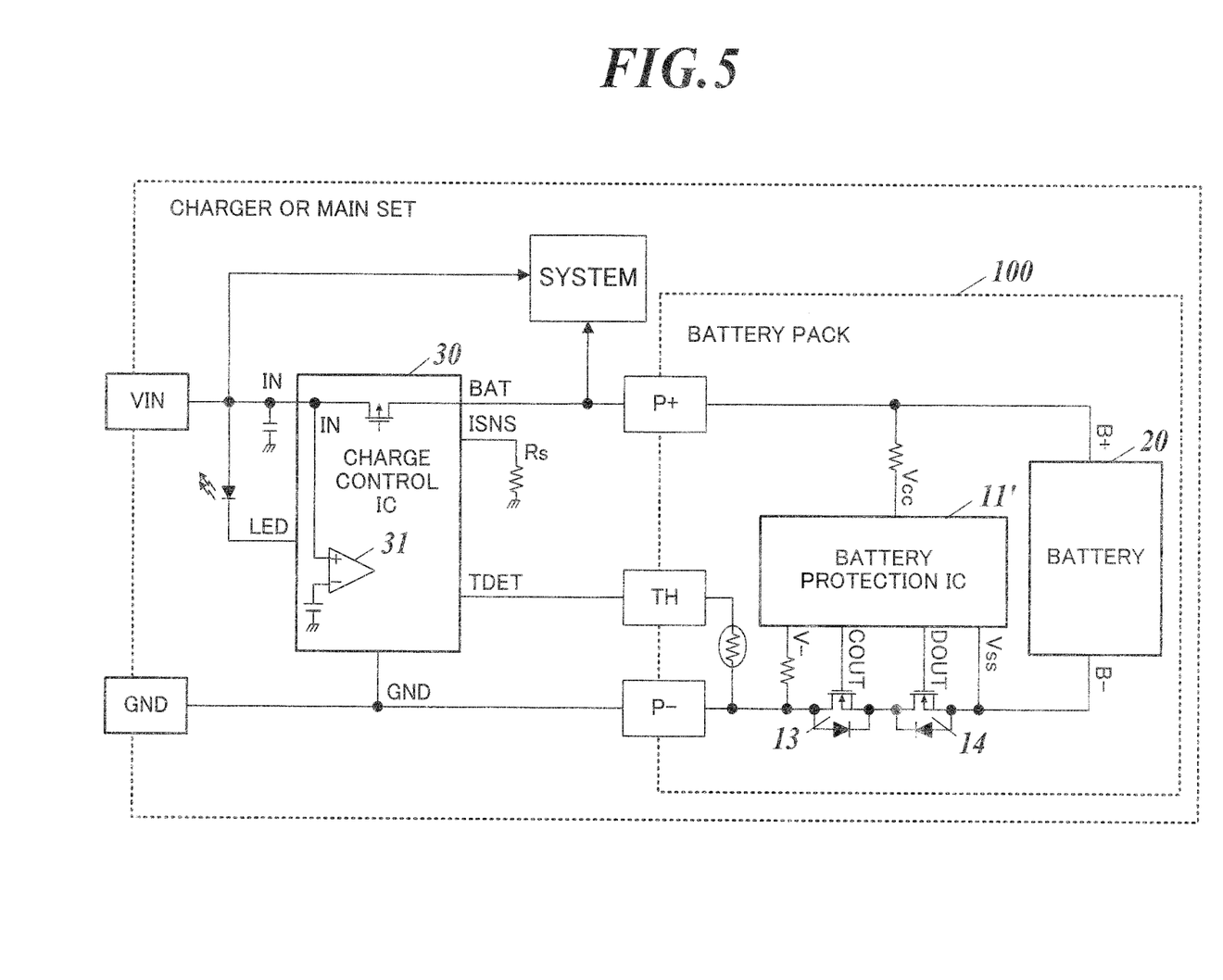
FIG. 5 is a circuit diagram illustrating a configuration example of a conventional-type battery pack including a charge control IC and a protection IC.

FIG. 5 illustrates a configuration example of a charge controller including: a conventional battery pack incorporating a protection IC; and a charge control IC charging the battery pack.

A battery pack 100 of FIG. 5 includes a protection IC 11' equipped with a protection function against overcharge or over-discharge. The battery pack 100 includes, in addition, a charge control FET (a field-effect transistor) 13 and a discharge control FET 14, which are provided in series between a terminal P− connected, to a charging power supply (an AC adaptor) and a terminal B− on the negative electrode side of the secondary battery 20. The protection IC 11' is configured to turn off the charge control FET 13 when the battery voltage reaches a predetermined voltage (about 4.275 V in the case of a lithium ion battery) or higher after charging starts.

When over-discharge is detected (not higher than about 2.3 V in the case of a lithium ion battery), the protection IC 11' turns off the discharge control FET 14 to protect the secondary battery from over discharge. At this time, the charge control FET 13 is turned on to enable charging.

On the other hand, the charge control IC 30 includes: a charging transistor 31; and a comparator 32 that monitors the voltage of a voltage input, terminal V+ to detect whether the AC adaptor is connected. When detecting that the AC adaptor is connected, the charge control IC 30 turns on the charging transistor 31 to start charging a battery pack 20. Moreover, the charge control IC 30 lights up an external LED during the charge control to show that the battery pack is being charged.

As described in Patent Document 1, in some types of charge control, when the battery voltage reaches a predetermined voltage (about 4.2 V in the case of a lithium ion battery) after charging starts, the protection IC 11' sends a signal to the charge control IC 30, and the charge control IC 30 switches control, from constant-current charge to constant-voltage charge.

In a conventional charger, generally, if the charger is connected to the charging power supply (AC adaptor) after the protection IC 11' detects over-discharge of the battery and turns off the discharge control FET 14, the discharge control FET 14 remains off until the voltage of the secondary battery is restored by preliminary charge (restored to about 2.3 V in the case of a lithium-ion battery). During the preliminary charge, charge is performed by current flowing through a substrate diode 14*d* parasitic between the source and drain of the discharge control FET 14. In such control, power loss (heat generation) occurs in the beginning of charge because the on-resistance of the substrate diode 14*d* of the discharge control FET 14 is higher than the on-resistance of the FET channel.

Moreover, in lithium-ion batteries, when the battery voltage reaches the deep discharge region (not more than about 1.0 V, for example), precipitation of metallic lithium sometimes causes an internal short-circuit. Accordingly, when the secondary battery in such a state (the deeply discharged state) is charged, the secondary battery could be damaged. The charge control IC therefore requires a function of not charging a deeply-discharged secondary battery.

However, in a battery pack with the discharge control FET 14 turned off, the voltage of the unit cell cannot be externally seen. The charge control IC therefore cannot directly know whether the secondary battery is deeply-discharged or over-discharged before deeply-discharged.

Accordingly, the charge control IC 30 is often equipped with a function of judging whether the battery is normal while gradually charging the battery (a charging sequence before the main charge sequence), called battery wake-up, rescue charge, force charge, and the like. However, the process of charge by the aforementioned charging sequence requires a lot of time because only a small current flows at the beginning of charge even when the secondary battery is discharged. Moreover, the above charging sequence is complicated, leading to problems such as an increase in scale of the IC and an increase in cost.

SUMMARY OF THE INVENTION

The present invention was made in the light of the above described background, and an object of the present invention is to provide a charge controller and a charge controlling semiconductor integrated circuit which are equipped with a function of not charging a deeply-discharged secondary battery without incorporating a charge sequence before the main charge in the charge sequence and are capable of starting quick charge within a comparatively short time.

Another object of the present invention is to provide a charge controller and a charge controlling semiconductor integrated circuit which are capable of avoiding occurrence of power loss (heat generation) at the beginning of charge for a discharged secondary battery.

According to an aspect of the present invention there is provided a charge controller with a protection function, including:

a charging transistor configured to apply charge current, to a secondary battery;

a charge control circuit that, when detecting that a charging power supply is connected, controls and causes the charging transistor to apply the charge current;

a first control switch element and a second control switch element connected in series between one terminal of the secondary battery and an external terminal; and a protection circuit, that, when the secondary battery is over-discharged, turns off the first control switch element to stop discharge current and when the secondary battery is deeply discharged, turns off the second control switch element to prevent the charge current from flowing into the secondary battery, wherein the protection circuit sends a charge inhibit signal to the charge control circuit when the secondary battery is deeply discharged, and while receiving the charge inhibit signal, the charge control circuit keeps the charging transistor off to prevent the charge current from flowing even if detecting that the charging power supply is connected.

Preferably, in the charge controller with a protection function, the charge control circuit is capable of performing constant-current charge control and constant-voltage charge control, and the charge control circuit starts the constant-current charge control upon detecting that the charging power supply is connected while not receiving the charge inhibit signal and switches to the constant-voltage charge control when the voltage of the secondary battery reaches a predetermined potential or higher.

Preferably, in the charge controller with a protection function, the charge control circuit sends a connection detection signal to the protection circuit upon detecting that the charging power supply is connected, and the protection circuit turns on the first control switch element upon receiving the connection detection signal even if the secondary battery is over-discharged.

Preferably, in the charge controller with a protection function, the charge control circuit and the protection circuit are formed as a semiconductor integrated circuit on one semiconductor chip.

Preferably, there is provided a battery pack, including: a charge controller; and a battery cell connected to the charge controller, wherein the charge controller and the battery cell are accommodated in one case.

DESCRIPTION OF THE PREFERRED EMBODIMENTS

Hereinafter, a description is given of a preferred embodiment of the present invention based on the drawings.

Figure 1:
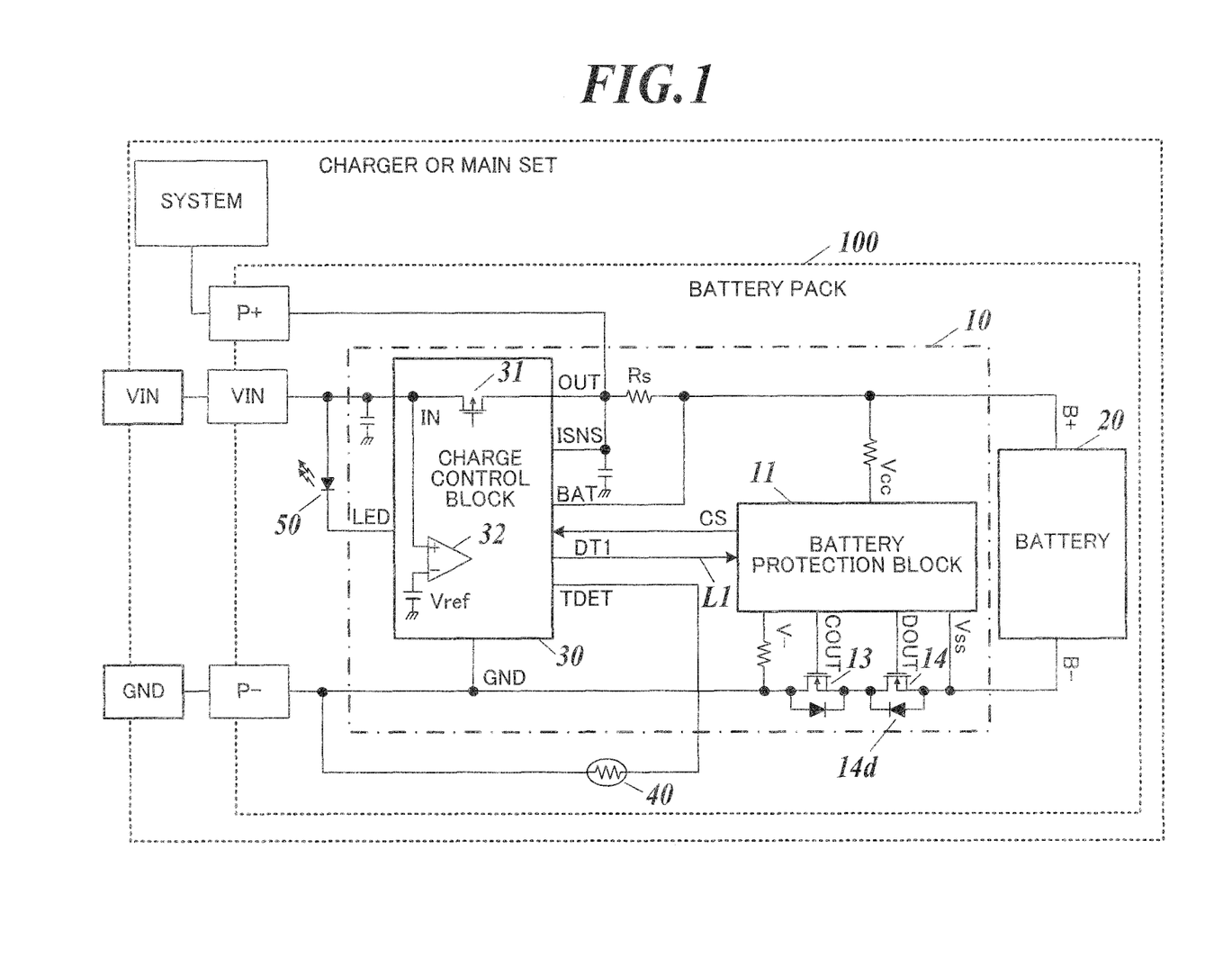
FIG. 1 is a circuit block diagram illustrating an embodiment of a battery pack incorporating a charge control IC according to the present invention.

FIG. 1 illustrates an embodiment of a battery pack including a charge controller to which the present invention is applied. The element constituting a circuit of the portion surrounded by a dashed-dotted line in FIG. 1, but not limited to, is formed on one semiconductor chip and is composed as a semiconductor integrated circuit (a charge control IC with a protection function) 10.

A battery pack 100 in this embodiment includes a charge control IC 10 with a protection function; a secondary battery (hereinafter, a battery cell) 20 such as a lithium-ion battery; a thermistor 40 for temperature detection; and a LED 50 showing that the battery cell 20 is being charged.

The charge control IC 10 with a protection function includes a protection block 11, a charging transistor 31, charge control block 30, a charge control FET 13 and a discharge control FET 14. The protection block 11 is equipped with a protection function against overcharge, over-discharge, and the like. The charging transistor 31 is composed of a P-channel MOSFET (an insulated gate-type field effect transistor) connected between a voltage input terminal VIN of the battery pack 100 and a terminal B+ on the positive electrode side of the battery cell 20. The charge control block 30 controls the charging transistor 31. The charge control FET 13 and the discharge control FET 14 composed of N-channel MOSFETs are provided in series between a terminal B− on the negative electrode side of the battery cell 20 and a terminal P− on the negative electrode side of the battery pack 100 and are controlled, by the protection block 11.

The charge control block 30 includes a comparator 32 for detecting whether a charging power supply (an AC adaptor) is connected to the voltage input terminal VIN. When the comparator 32 detects that the AC adaptor is connected, the charge control block 30 turns on the charging transistor 31 to start charging the battery cell 20. The comparator 32 detects whether the AC adaptor is connected by comparing reference voltage Vref with voltage of the voltage input terminal VIN of the battery pack 100 or a fraction of the same.

The charge control block 30 includes: a function of charging the battery cell 20 with constant current while monitoring voltage across the terminals of a sense resistor Rs for current detection, the sense resistor Rs being provided in series to the charging transistor 31; and a function of charging the battery cell 20 with a constant voltage while monitoring voltage of a terminal BAT, to which the voltage of terminal B+ of the battery cell 20 is inputted.

Specifically, the charge control block 30 controls the charging transistor 31 as follows. In the case of a lithium-ion battery, just after the start of charge, the charge control block 30 starts preliminary charge with a current value of 0.1 C (10% of the current value at quick charge), and when the battery voltage reaches 2.9 V, the charge control block 30 switches to constant-current charge (quick charge). When the battery voltage then reaches 4.2 V, the charge control block 30 switches to constant-voltage charge and continues charging. When detecting completion of charge (detecting that the charge current is reduced to a predetermined value or less, for example), the charge control block 30 turns off the charging transistor 31 to terminate the charge.

The charge control block 30 further includes: a function of applying bias to the thermistor 40 for temperature detection and stopping charging when determining that the detected temperature abnormal; and a function of stopping charging when detecting overvoltage based on the voltage of the terminal BAT. The charge control block 30 still further includes: a function of monitoring the voltage of a terminal ISNS connected to the sense resistor Rs and stopping charging when detecting overcharge current; a function of lighting up the external LED 50 during the charge control to show that the battery cell 20 is being charged; and the like.

The battery pack 100 of the embodiment includes a transmission line L1 transmitting detection signal DT1 of the comparator 32, which detects connection of the AC adaptor, from the charge control block 30 to the protection block 11.

Next, a description is given of a function of the above-described protection block 11.

The protection block 11 includes an overcharge protection function and an over-discharge protection function. The overcharge protection function is to protect the battery by turning off the charge control FET 13 when the battery voltage reaches a predetermined voltage (about 4.275 V in the case of a lithium-ion battery) or higher after turning on the charge control FET 13 to start charging. The over-discharge protection function is to protect the battery by turning off the discharge control FET 14 when detecting over-discharge (about 2.3 V or lower in the case of a lithium-ion battery) after the battery pack is connected to a load to start discharging the battery cell 20.

The protection block 11 also includes: a deep-discharge protection function of turning off both the charge control FET 13 and the discharge control FET 14 to inhibit charge and discharge when detecting that the battery is deeply discharged (for example, about 1.0 V or lower); and a function of sending charge inhibit signal CS to the charge control block 30 when detecting that the battery is deeply-discharged. When the battery is just over-discharged, the protection block 11 turns off the discharge control FET 14 and turns on the charge control FET 13.

On the other hand, upon receiving the charge inhibit signal CS from the protection block 11, the charge control block 30 of this embodiment turns off the charging transistor 31 while the charge inhibit signal CS inhibits charging. The charge control IC 10 does not need to incorporate a function of gradually charging a battery while determining whether the battery is normal, which is called rescue charge or forced charge (a charging sequence before a main charge) and does not require charge by the charging sequence before the main charge. Accordingly, the charge control IC 10 can conduct quick charge by constant-current charge immediately after charging starts, thus shortening the necessary charging time. Moreover, the cost of the IC can be reduced compared to an IC incorporating the charging sequence before the main charge.

The charge inhibit signal CS inhibiting charging may be either high level or low level. The state where the charge inhibit signal CS inhibits charging (high or low level) is defined as a state where the charge control block is receiving the charge inhibit signal CS, and the state where the charge inhibit signal CS does not inhibit charging (low or high level) is defined as a state where the charge control block is not receiving the charge inhibit signal CS.

Preferably, the charge control circuit is configured to be able to perform constant-current charge control and constant-voltage charge control. When detecting that the charging power supply is connected in the state where the charge control circuit is not receiving the charge inhibit signal, the charge control circuit starts the constant current charge control. When the voltage of the secondary battery is equal to or higher than a predetermined potential, the charge control circuit switches to the constant-voltage charge control.

The control circuit can therefore immediately start charging unless the secondary battery is deeply discharged, and the total necessary charging time can be shortened. Moreover, the charge control circuit does not start charging if the secondary battery is deeply discharged. This can prevent degradation of the deeply-discharged secondary battery.

When the charge controller is connected to a charging power supply (AC adaptor) in the state where over-discharge of the battery is detected and the discharge control FET 14 is off, the protection IC 11' of a conventional battery pack illustrated in FIG. 5 turns off the discharge control FET 14 until the voltage of the secondary battery is restored by preliminary charge (restored to about 2.3 V in the case of a lithium-ion battery). Accordingly, while the discharge control FET 14 is off, the battery is charged with current flowing through a substrate diode 14*d* parasitic between the source and the drain of the FET 14.

As illustrated in FIGS. 6A to 6D, when the voltage of the secondary battery is restored by preliminary charge (timing t2 when the voltage reaches about 2.3 V in the case of a lithium-ion battery), the discharge control. FET 14 is turned on. Thereafter, at timing t3 when the voltage of the secondary battery reaches 2.9 V, quick charge by constant-current charge is started, and at timing t4 where the voltage of the secondary battery reaches 4.2 V, the charge is switched to constant-voltage charge.

On the other hand, the battery pack of the embodiment includes the transmission line L1 transmitting the detection signal DT1 of the comparator 32, which is provided for the charge control block 30 and detects whether the AC adaptor is connected, to the protection block 11. Upon receiving the detection signal DT1 indicating that the AC adaptor is connected, as shown in FIGS. 2A to 2D, the protection block 11*l* turns on the discharge control FET 14 at connection detected, timing t1. For such control, the gate control signal of the discharge control FET 14 can be readily generated in the following manner. An OR gate is provided for the protection block 11 of the embodiment to calculate a logical OR of control signal DOUT outputted from the protection IC 11' of FIG. 5 and the connection detection signal DT1, and the output of the OR gate is used as the gate control signal DOUT of the discharge control FET 14.

Figure 6A:
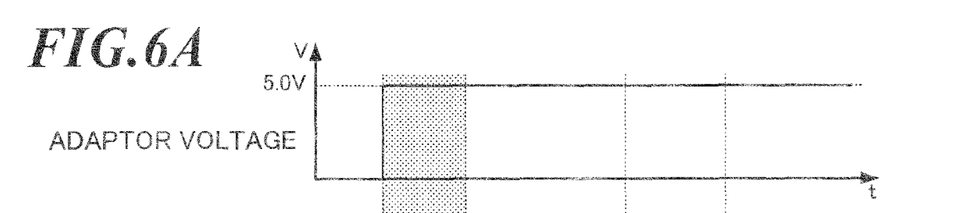
FIG. 6A is a timing diagram illustrating changes in adaptor voltage in the conventional-type battery pack including the charge control IC and the protection IC.
Figure 6B:
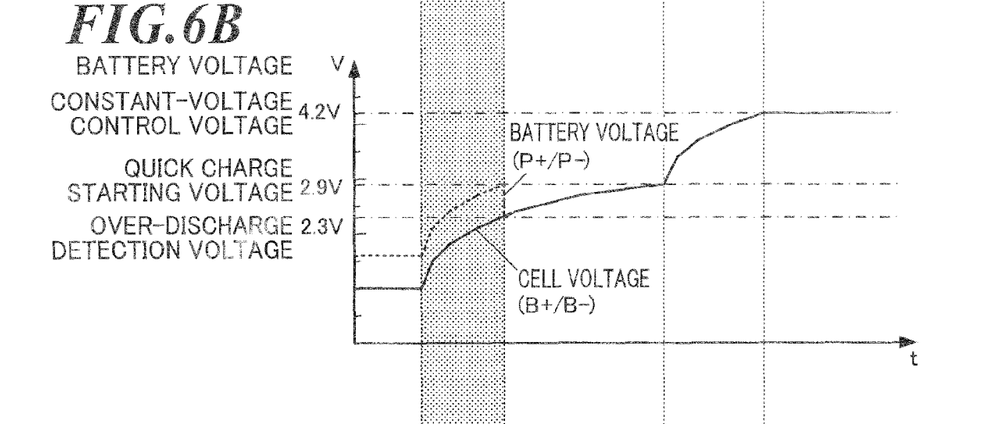
FIG. 6E is a timing diagram illustrating changes in battery voltage in the conventional-type battery pack including the charge control IC and the protection IC.
FIG. 6C is a timing diagram illustrating changes in charge current in the conventional-type battery pack including the charge control IC and the protection IC.
FIG. 6D is a timing diagram illustrating changes in output voltage in the conventional-type battery pack including the charge control IC and the protection IC.
Figure 6C:
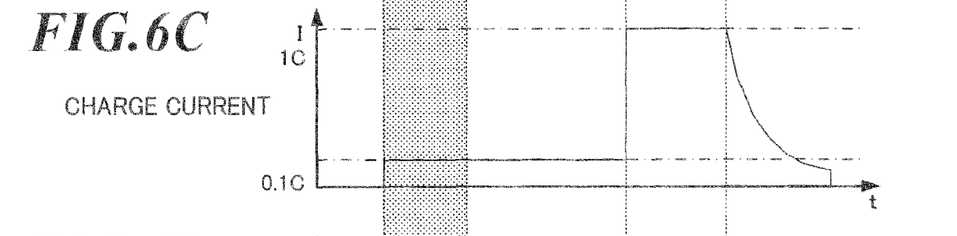
Figure 6D:
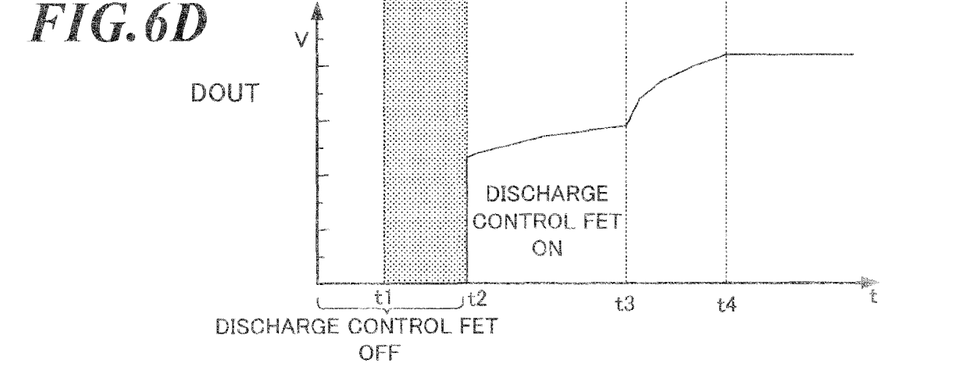

In the conventional battery pack illustrated in FIG. 5, charge is performed with current flowing through the substrate diode 14d parasitic between the source and the drain of the discharge control FET 14 during a period from t1 to t2 in FIGS. 6A to 6B. This can produce large power loss.

On the other hand, in the battery pack of the embodiment, as shown in FIGS. 2A to 2D, the discharge control FET 14 is turned on by the protection block 11 at the timing t1 when the AC adaptor is connected, so that charging is performed with current flowing through the channel of the FET 14. This eliminates the period when the charging current flows through the substrate diode parasitic to the FET, thus reducing the power loss just after charging starts.

Figure 2A:
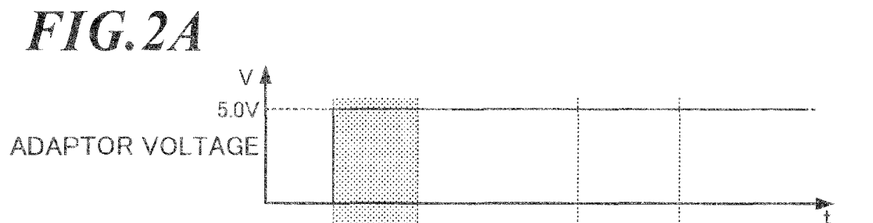
FIG. 2A is a timing diagram showing changes in adaptor voltage in the battery pack of the embodiment of the present invention.
Figure 2B:
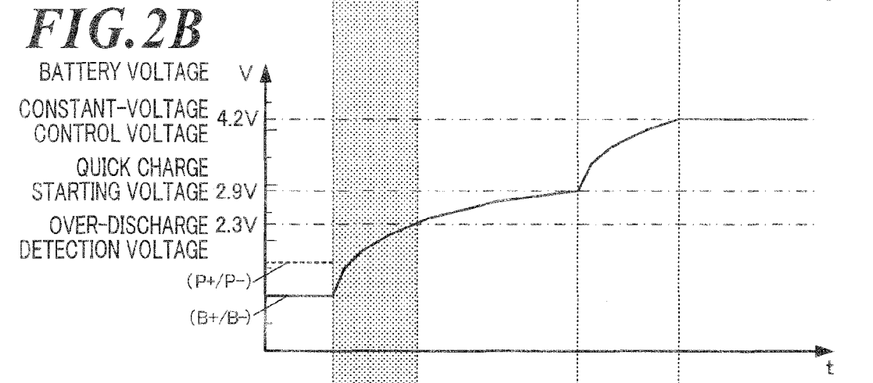
FIG. 2B is a timing diagram showing changes in battery voltage in the battery pack of the embodiment of the present invention.
Figure 2C:
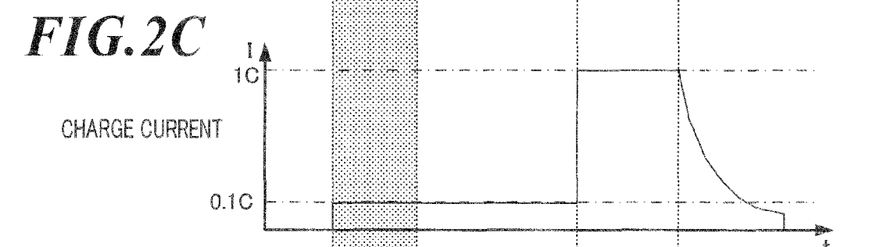
FIG. 2C is a timing diagram showing changes in charge current in the battery pack of the embodiment of the present invention.
Figure 2D:
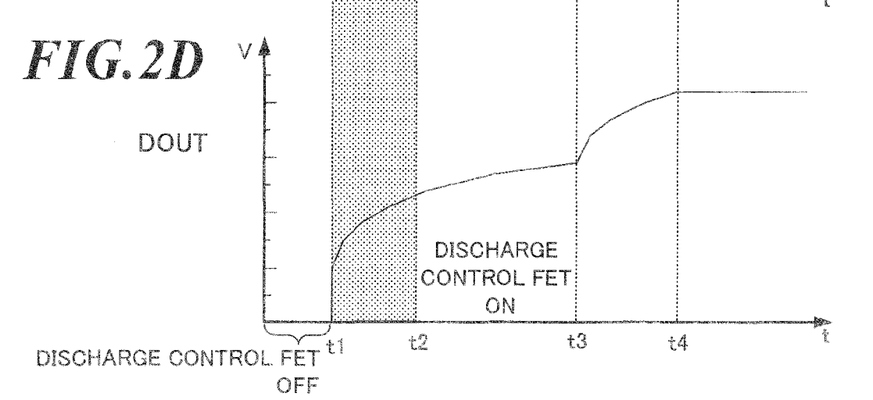
FIG. 2D is a timing diagram showing changes in output voltage in the battery pack of the embodiment of the present invention.

In characteristic curves of voltage changes shown in FIGS. 2B and 6B, each solid line represents battery cell voltage (B+/B−) monitored by the protection IC, and each dashed line represents battery voltage (P+/P−) monitored by the charge control IC 30. The difference between the above voltages VP shown in FIG. 60 corresponds to forward voltage of the substrate diode 14d. In the conventional battery pack (FIG. 5), the discharge control FET 14 is turned on at the time when the cell voltage (B+/B−) reaches 2.3 V (the timing t2 in FIGS. 6A to 6D). Accordingly, the battery voltage (P+/P−) monitored by the charge control IC 30 then gets equal to the cell voltage (B+/B−) after the timing t2.

On the other hand, in the battery pack of the embodiment, the discharge control FET 14 is turned on at the time when the AC adaptor is connected (timing t1 in FIG. 2). Accordingly, the battery voltage (P+/P−) monitored by the charge control block 30 then gets equal to the cell voltage (B+/B−) immediately after t1.

Figure 7:
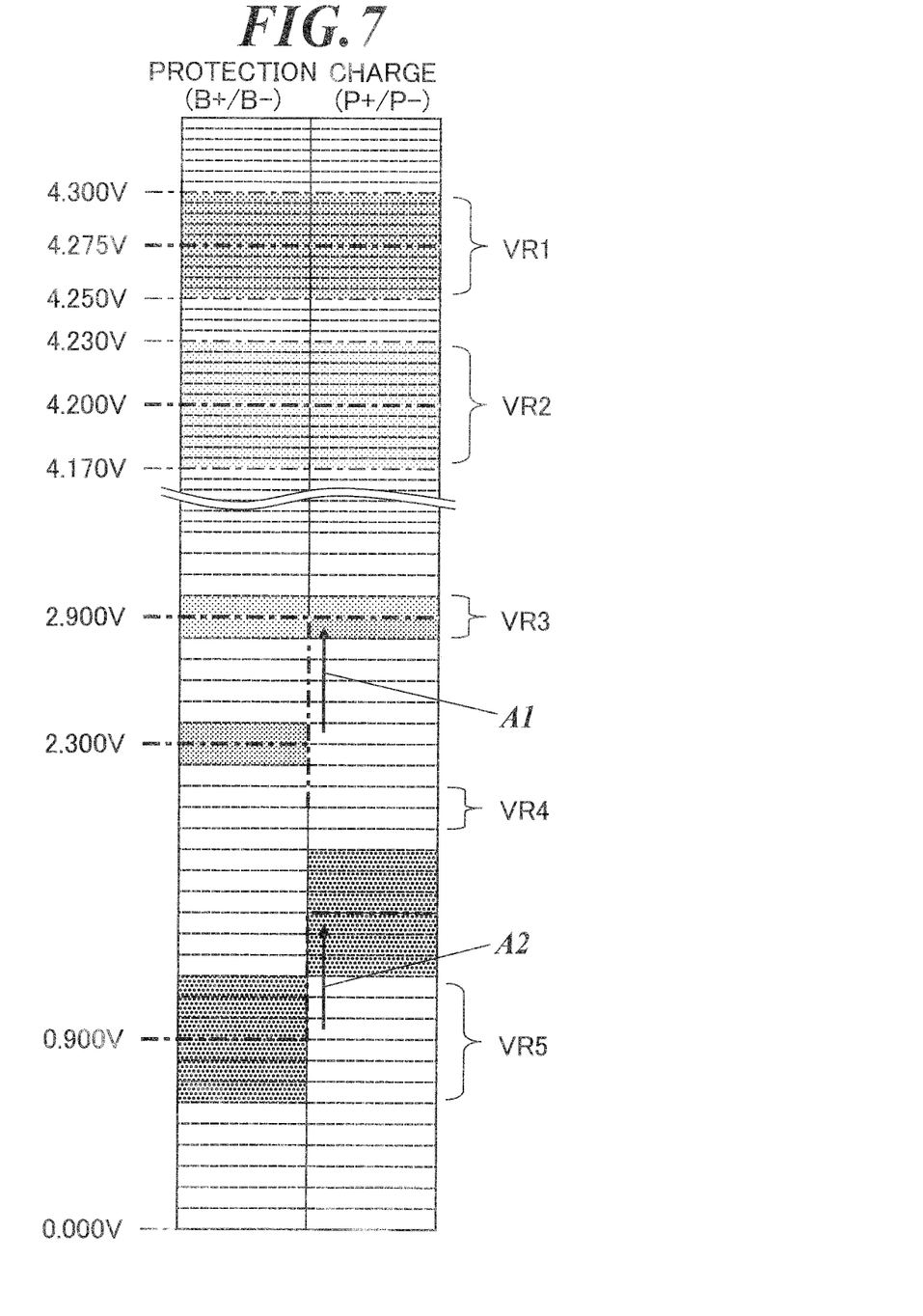
FIG. 7 is an explanatory chart illustrating a relationship between detected voltages for charge and protection by the charge control IC and protection IC in a conventional-type charge controller including the charge control IC and the protection IC.

FIG. 7 is explanatory view showing a relationship between voltages detected for charge and protection by the charge control IC and protection IC in the conventional-type charge controller including a charge control IC and a protection IC. In FIG. 7, VR1 indicates a range of overcharge detection voltage in the protection IC (reference numeral 11' in FIG. 5); VR2 indicates a voltage range of constant-voltage control in the charge control IC (reference numeral 30 in FIG. 5); VR3 indicates a range of quick charge starting voltage in the charge control IC; VR4 indicates a range of over-discharge detection voltage in the protection IC; and VR5 indicates a range of 0-V charge inhibit voltage in the protection IC. In FIG. 7, arrows A1 and A2 show that it is higher by the forward voltage VF of the discharge control FET (reference numeral 14 in FIG. 5).

Figure 8:
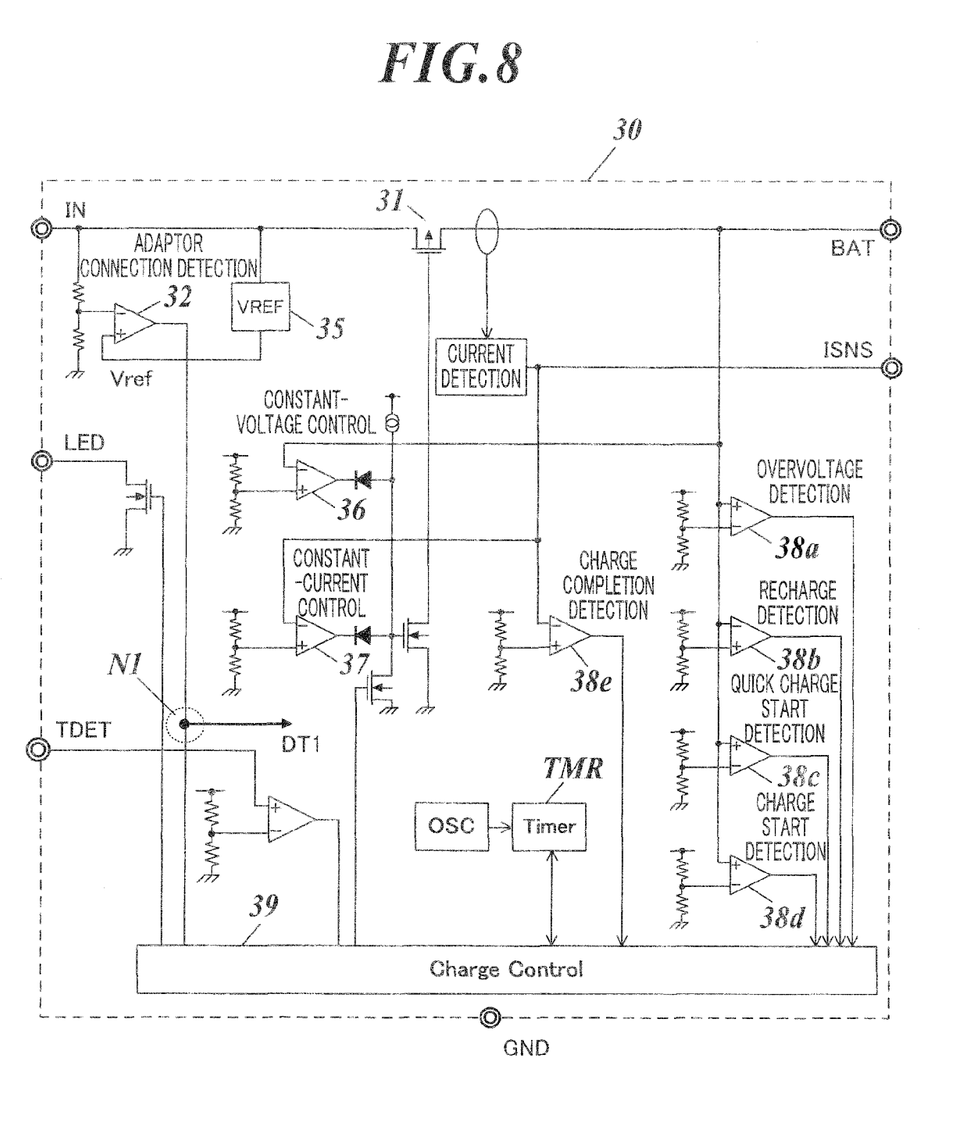
FIG. 8 is a circuit diagram illustrating a specific example of the charge control IC constituting the charge controller.

FIG. 8 illustrates a specific circuit example designed as the charge control IC 30 constituting the charge controller illustrated in FIG. 5.

The charge control IC 30 of FIG. 8 includes the charging transistor 31 and the comparator 32 configured to compare voltage of the input terminal IN, in which voltage of the AC adaptor is inputted, and the reference voltage Vref from a reference voltage source 35 to detect connection of the adaptor. Moreover, the charge control. IC 30 includes a constant-voltage charge control comparator 36 and a constant-current charge control comparator 37. The constant-voltage charge control comparator 36 compares the voltage of the terminal BAT connected to the terminal of the battery cell and a voltage supplied from the power supply voltage by resistive voltage division and generates a voltage controlling the gate voltage of the charging transistor 31. The current-constant charge control comparator 37 compares the voltage of the terminal ISNS connected to the current sense resistor and a voltage supplied from the power supply voltage by resistive voltage division and generates a voltage controlling the gate voltage of the charging transistor 31.

Furthermore, the charge control IC 30 of FIG. 8 further includes: a comparator 38a monitoring the voltage of the terminal BAT to detect overvoltage; a comparator 38b detecting recharge; a comparator 38c detecting start of quick charge; a comparator 38d detecting the start of charge; a comparator 38e detecting completion of charge; a charge control circuit 39 controlling the charging transistor 31 based on the output from the above comparators; an oscillator OSC; a timer TMR; and the like.

In the above-described embodiment (FIG. 1), the circuit configuration of the charge control IC of FIG. 8 can be applied as the charge control block 30. In this case, the adaptor connection detection signal DT1 transmitted from the charge control block 30 to the protection block 11 can be taken out through a node N1 in the charge control IC 30 of FIG. 8.

Figure 9:
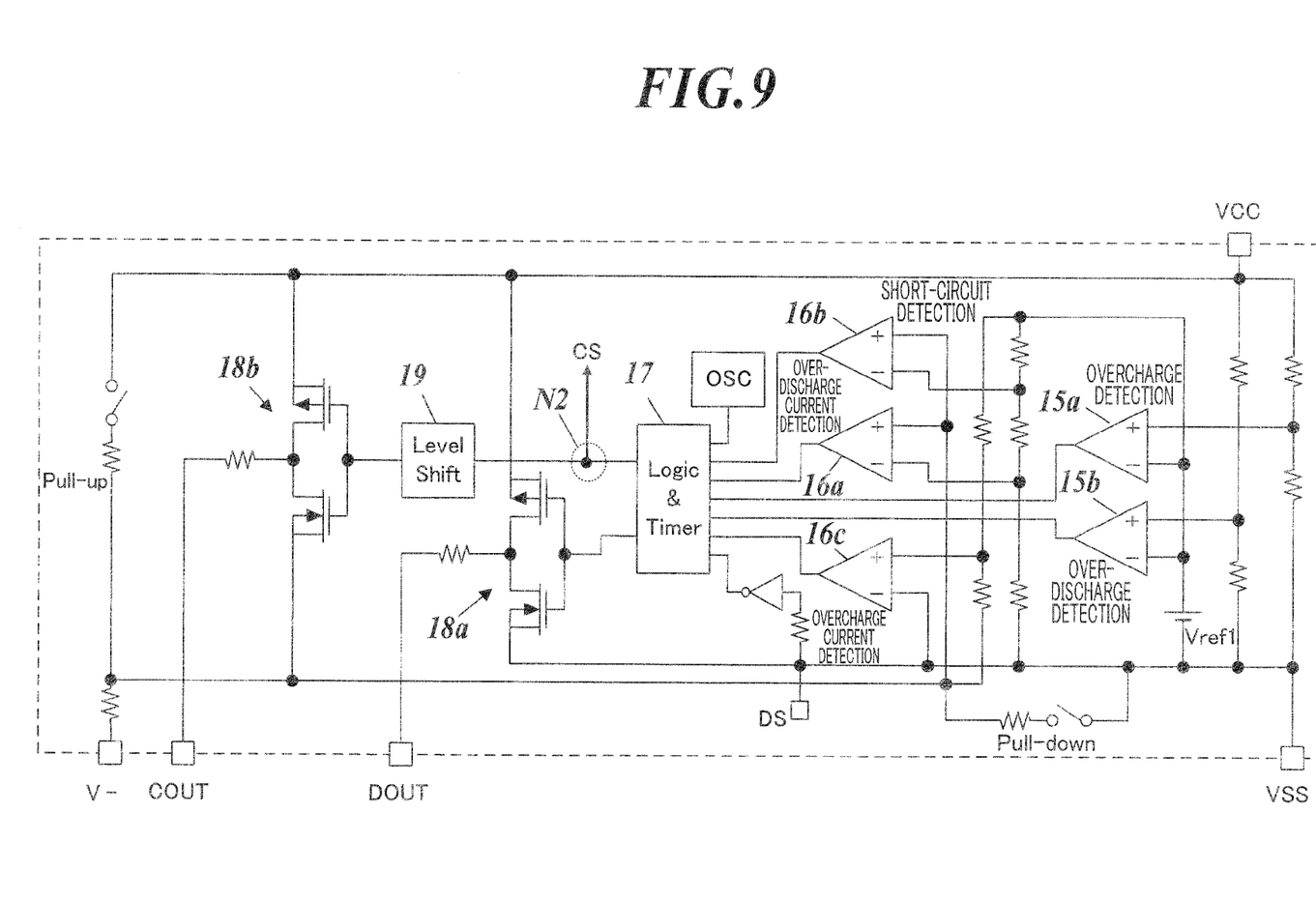
FIG. 9 is a circuit diagram illustrating a specific example of the protection. IC constituting the charge controller.

FIG. 9 illustrates a specific circuit example designed as the protection IC constituting the charge controller shown in FIG. 5.

The protection IC 11' of FIG. 9 includes a charging transistor 31 and comparators 15a and 15b which respectively detect overcharge of the battery cell and over-discharge of the battery cell by comparing the reference voltage Vref1 with voltage supplied from the power supply terminal VCC, on which voltage of the battery cell is applied, by resistive voltage division.

The protection IC 11' further includes: comparators 16a, 16b, and 16c detecting an over-discharge current state, a short-circuit, and an overcharge current state, respectively by comparing voltage supplied from the power supply terminal VCC by resistive voltage division with the reference voltage Vref1; a logic & timer circuit 17 generating control signals for the charge control FET 13 and the discharge control FET 14 based on the output of the above comparators 16a to 16c; buffer circuits 18a and 18b outputting the generated control signals to the terminals DOUT and COUT; an oscillator OSC; a level shift circuit 19; and the like.

In the aforementioned embodiment (FIG. 1), the circuit configuration of the protection IC of FIG. 9 is applicable as the protection block 11. In this case, the charge inhibit signal CS transmitted from the protection block 11 to the charge control block 30 sari be taken out through a node N2 in the protection IC 11' of FIG. 9.

In this embodiment, the charge control block 30 as the charge control circuit and the protection block 11 as the protection circuit are formed as a semiconductor integrated, circuit on one semiconductor chip. Accordingly, the charge controller and the battery cell are easily accommodated within one case and formed as a battery pack. Moreover, to transmit and receive the charge inhibit signal and the connection detection signal between the charge control circuit and the protection circuit, it is unnecessary to provide a dedicated external terminal, thus preventing an increase in number of external terminals due to sophistication of the charge controller.

Moreover, the battery pack of this embodiment can start charging without a charge sequence before main charge for gradually charging while determining whether the battery is normal called rescue charge or forced charge. Moreover, the charge control circuit is provided within a case, thus enabling non-contact charge.

Furthermore, in a conventional battery pack including a protection IC and a battery cell accommodated within a case, in a case where the charge controller has a function of stopping charging when abnormal temperature is detected by an equipped thermistor, the battery pack needs to be provided with a terminal to output a signal indicating the state of the thermistor. However, the battery pack of this embodiment includes the charge control circuit and accordingly does not require a terminal to output the signal indicating the state of the thermistor. The number of terminals of the battery pack can be therefore reduced.

Figure 3:
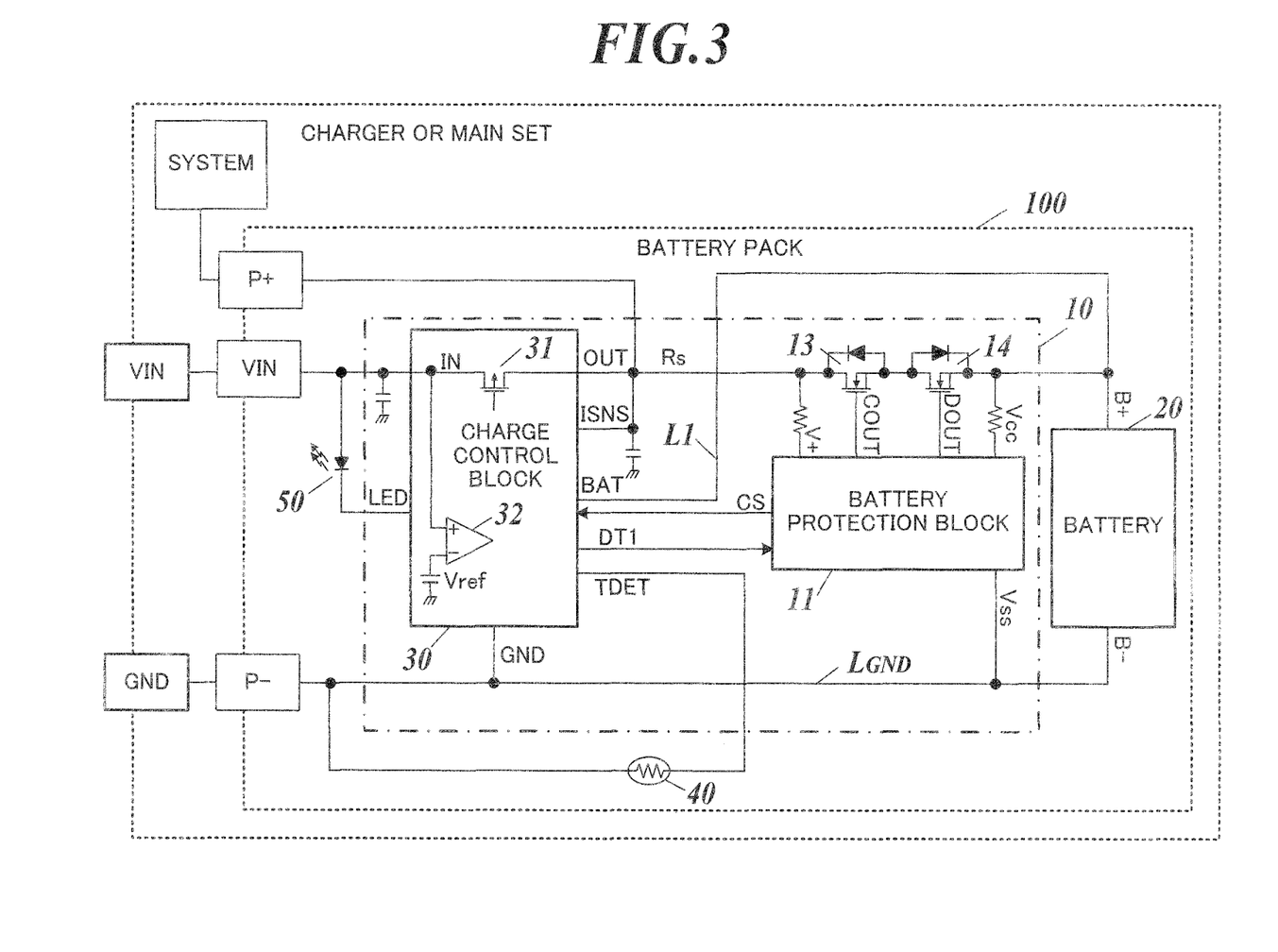
FIG. 3 is a circuit block diagram illustrating a first modification of the charge control IC of the embodiment of the present invention.

FIG. 3 illustrates a first modification of the battery pack of the embodiment. The battery pack 100 of the embodiment of FIG. 1 is an application of low-side control in which the charge control FET 13 and the discharge control FET 14, each composed of a P channel-type MOSFET, are provided for the terminal B– on the negative electrode side of the battery cell 20 to be controlled by the protection block 11. In contrast, the battery pack 100 of a modification of FIG. 3 is an application of high-side control in which the charge control FET 13 and the discharge control FET 14 are provided for the terminal B+ on the positive electrode side of the battery cell 20 to be controlled by the battery protection block 11. The charge control FET 13 and the discharge control FET 14 may be composed of N channel-type MOSFETs.

Also in this modification, the detection signal DT1 indicating whether the AC adaptor is connected is transmitted from the charge control block 30 to the protection block 11, and the signal CS showing inhibition of charge is transmitted from the protection block 11 to the charge control block 30.

In the modification of FIG. 3, the voltage monitored by the charge control block 30 is taken out near the terminal B+ on the positive electrode side of the battery cell 20. This can prevent the required charging time from the start to end of charge from being increased because of a drop of the monitored voltage due to the impedance of the charge control FET 13 and the discharge control FET 14.

In the modification of FIG. 3, instead of the sense resistance Rs, a transistor forming a current mirror connection with the charging transistor 31 is provided within the charge control block 30, and current control is performed by applying current proportional to the charging current flowing through the charging transistor 31 to the current mirror circuit and detecting the current value thereof.

The functions of the protection block 11 and the charge control block 30 are the same as those of the embodiment of FIG. 1, and overlapping description is omitted.

Figure 4:
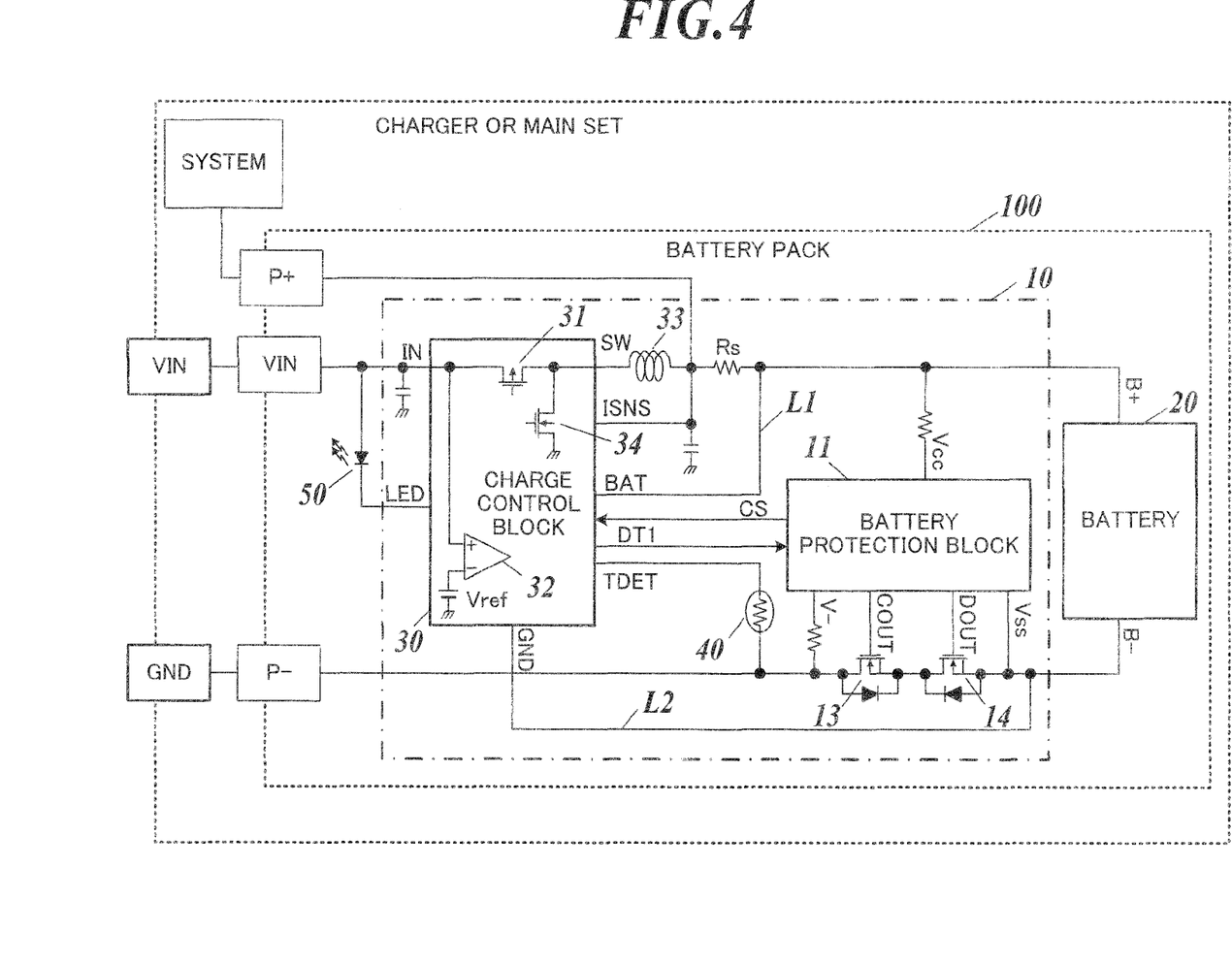
FIG. 4 is a circuit block diagram illustrating second modification of the charge control IC of the embodiment of the present invention.

FIG. 4 illustrates a second modification of the battery pack 100 of this embodiment. In the battery pack 100 of the embodiment of FIG. 1, the charge control block 30 controls the charging transistor 31 in a linear control method. On the other hand, the battery pack 100 of the modification of FIG. 4 is configured as a switching regulator-type charge controller. Specifically, an inductor (coil) 33 is connected in series with the charging transistor 31, and a transistor (FET) 34 for synchronous rectification is provided between the ground and the connection node of the charging transistor 31 and the inductor 33. The charging transistor 31 and the transistor 34 for synchronous rectification are alternately turned on to apply charge current.

The invention made by the inventor is specifically described based on the embodiment above. However, the present invention is not limited to the embodiment. In the embodiment, for example, the protection block 11, the charge control block 30, the charge control FET 13 and the discharge control FET 14, and the charging transistor 31 are formed on one semiconductor chip to constitute a semiconductor integrated circuit as a whole. However, the protection block 11 and the charge control block 30 may be composed of different semiconductor integrated circuits. Moreover, the charge control FET 13 and the discharge control FET 14, the charging transistor 31, and the sense resistor Rs may be composed of external elements instead of on-chip elements.

Furthermore, the battery pack 100 of the embodiment includes the charge control block 30 and charging transistor 31 and can charge by itself. Accordingly, the terminals VIN and P– of the battery pack 100 may be connected to a non-contact charge module to constitute a system for charge by a non-contact method.

In the embodiment, the charging transistor 31 controlled by the charge control block 30 is an FET but the transistor may be a bipolar transistor.

According to the present invention, it is possible to implement a charge controller (a charge controlling semiconductor integrated circuit) capable of preventing generation of power loss (generation of heat) at the beginning of charge for a discharged secondary battery.

Moreover, it is possible to implement a charge controller and a charge controlling semiconductor integrated circuit which have a function of not charging a deeply-discharged secondary battery without incorporating the charge sequence before main charge and is capable of starting quick charge within a comparatively short time.

The entire disclosure of Japanese Patent Application No. 2012-013393 filed on Jan. 25, 2012 including description, claims, drawings, and abstract is incorporated herein by reference in its entirety.

What is claimed is:

1. A charge controller with a protection function, comprising:
   a charging transistor configured to apply charge current to a secondary battery;
   a charge control circuit that, when detecting that a charging power supply is connected, controls and causes the charging transistor to apply the charge current;
   a first control switch element and a second control switch element connected in series between one terminal of the secondary battery and an external terminal; and
   a protection circuit that, when the secondary battery is over-discharged, turns off the first control switch element to stop discharge current and when the secondary battery is deeply discharged, turns off the second control switch element to prevent the charge current from flowing into the secondary battery,
   wherein the protection circuit sends a charge inhibit signal to the charge control circuit when the secondary battery is deeply discharged, and while receiving the charge inhibit signal, the charge control circuit keeps the charging transistor off to prevent the charge current from flowing even if detecting that the charging power supply is connected;
   wherein the charge control circuit is configured to perform constant-current charge control and constant-voltage charge control; and
   wherein the charge control circuit starts the constant-current charge control upon detecting that the charging power supply is connected while not receiving the charge inhibit signal and switches to the constant-voltage charge control when the voltage of the secondary battery reaches at least a predetermined potential.

2. The charge controller with a protection function according to claim 1, wherein:
   the charge control circuit sends a connection detection signal to the protection circuit upon detecting that the charging power supply is connected, and
   the protection circuit turns on the first control switch element upon receiving the connection detection signal even if the secondary battery is over-discharged.

3. The charge controller with a protection function according to claim 1, wherein the charge control circuit and the protection circuit are formed as a semiconductor integrated circuit on one semiconductor chip.

4. A battery pack, comprising:
the charge controller according to claim 1; and
a battery cell connected to the charge controller,
wherein the charge controller and the battery cell are accommodated in one case.

* * * * *